US012789298B2

(12) United States Patent
Ji et al.

(10) Patent No.: US 12,789,298 B2
(45) Date of Patent: Nov. 10, 2026

(54) SOLDER PASTE

(71) Applicant: Heraeus Materials Technology Shanghai Ltd., Shanghai (CN)

(72) Inventors: Liangzheng Ji, Shanghai (CN); Jing Zhang, Shanghai (CN)

(73) Assignee: HERAEUS MATERIALS TECHNOLOGY SHANGHAI LTD., Shanghai (CN)

( * ) Notice: Subject to any disclaimer, the term of this patent is extended or adjusted under 35 U.S.C. 154(b) by 45 days.

(21) Appl. No.: 18/992,793

(22) PCT Filed: Jul. 14, 2022

(86) PCT No.: PCT/CN2022/105681
§ 371 (c)(1),
(2) Date: Jan. 9, 2025

(87) PCT Pub. No.: WO2024/011492
PCT Pub. Date: Jan. 18, 2024

(65) Prior Publication Data

US 2026/0241494 A1 Aug. 20, 2026

(51) Int. Cl.

| | |
|---|---|
| ***B23K 35/26*** | (2006.01) |
| ***B23K 1/00*** | (2006.01) |
| ***B23K 35/02*** | (2006.01) |
| ***B23K 35/36*** | (2006.01) |
| ***B23K 35/365*** | (2006.01) |

(52) U.S. Cl.
CPC .......... *B23K 35/262* (2013.01); *B23K 1/0016* (2013.01); *B23K 35/025* (2013.01); *B23K 35/3613* (2013.01); *B23K 35/365* (2013.01)

(58) Field of Classification Search
CPC .. B23K 35/262; B23K 1/0016; B23K 35/025; B23K 35/3613; B23K 35/365; B23K 2101/36; B23K 1/19
See application file for complete search history.

(56) References Cited

U.S. PATENT DOCUMENTS

| | | | | |
|---|---|---|---|---|
| 3,703,254 | A * | 11/1972 | Maierson | B23K 35/0244 428/407 |
| 6,115,262 | A | 9/2000 | Brunner et al. | |

FOREIGN PATENT DOCUMENTS

| | | | |
|---|---|---|---|
| CN | 114728382 | A | 7/2022 |
| JP | H06122090 | A | 5/1994 |
| JP | 2000094179 | A | 4/2000 |
| JP | 2004237345 | A | 8/2004 |
| JP | 2015147250 | A * | 8/2015 |
| JP | 2016087606 | A | 5/2016 |
| JP | 2016097420 | A | 5/2016 |
| TW | 201124223 | A | 7/2011 |
| WO | 2011023394 | A1 | 3/2011 |
| WO | 2011151894 | A1 | 12/2011 |
| WO | 2015091272 | A1 | 6/2015 |
| WO | 2015178374 | A1 | 11/2015 |

* cited by examiner

*Primary Examiner* — Jessee R Roe
(74) *Attorney, Agent, or Firm* — Blank Rome LLP

(57) ABSTRACT

A solder paste consisting of 40 to 60 wt.-% of a solder powder with an absolute particle size of the powder particles in the range of 2 to 25 μm, and 40 to 60 wt.-% of a flux.

18 Claims, No Drawings

SOLDER PASTE

Solder paste, in particular soft solder paste, is used primarily in the manufacture of electronic circuits and serves to produce a mechanical, electrical, and thermal connection between an electronic component and a substrate, more precisely between corresponding metallic contact pads (metallic contact surfaces, contact metallizations) thereof provided for this purpose. The metallic contact pads are comprised of bulk metal (e.g. pure metal or a metal alloy) or they may have a metallic surface plating; the metal as such or the metal of the metallic surface plating may be selected among metals such as, for example, copper and copper-based alloys, tin and tin-based alloys, silver and silver-based alloys, gold and gold-based alloys and nickel and nickel-based alloys.

Examples of electronic components in the sense of the present disclosure include diodes, LEDs (light-emitting diodes), dies, IGBTs (insulated-gate bipolar transistors, bipolar transistors with an insulated gate electrode), MOSFETs (metal-oxide-semiconductor field-effect transistors), ICs (integrated circuits), sensors, heat sinks, resistors, capacitors, coils, connecting elements (e.g., clips), base plates, antennas, and the like.

Examples of substrates in the sense of the present disclosure include lead frames, PCBs (printed circuit boards), flexible electronics, ceramic substrates, metal-ceramic substrates, such as DCB substrates (direct copper-bonded substrates), IMS (insulated metal substrates), glass substrates and the like.

An electronic component is usually brought into contact with or applied to a substrate via a solder paste. The solder paste is heated to melt the solder in the paste by a reflow process, thereby forming the contact between the corresponding metallic contact pads of the electronic component and the substrate. After cooling and solidification of the solder, the electronic component and the substrate are firmly connected to (attached to) one another via their corresponding metallic contact pads with the solidified solder in between.

Solder pastes generally contain fluxes, which, among other things, serve to dissolve an optionally present undesired oxide layer on the surfaces of the solder powder, of the metallic contact pads of the electronic component, and of the metallic contact pads of the substrate, and to thus ensure better wettability during the soldering process.

WO 2015/178374 A1 discloses a solder paste for fixing solder balls. The solder paste comprises solder powder and 75 to 93 vol.-% (percent by volume) of solder flux.

In the electronics industry there is a continuous development towards miniaturization leading to so-called fine-pitch or even ultrafine-pitch applications with very small dimensions of down to ≤100 μm. The term "pitch" stands for the distance between the centre of a metallic contact pad and the centre of a neighbouring (adjacent) metallic contact pad. Such development leads to an increasing electronic packaging density and places increased demands on solder paste.

The object of the invention is to provide a solder paste which can be used even in fine pitch or ultrafine-pitch applications.

The invention relates to a solder paste consisting of 40 to 60 wt.-% (percent by weight) of a solder powder with an absolute particle size of the powder particles in the range of 2 to 25 μm, and 40 to 60 wt.-% of a flux. The flux itself consists of:

- i) 50 to 60 wt.-% of at least one optionally modified natural resin;
- ii) 15 to 30 wt.-% of at least one organic solvent;
- iii) 5 to 15 wt.-% of at least one thickener;
- iv) 5 to 10 wt.-% of at least one activator; and
- v) 0 to 10 wt.-% of at least one additive other than constituents i) to iv).

The wt.-% of the solder powder and the wt.-% of the flux total 100 wt.-%. Same is true for the sum of the wt.-% of the flux' constituents i) to v).

The solder paste of the invention comprises 40 to 60 wt.-% of a solder powder, in particular a tin-based solder powder. The solder powder has an absolute particle size of the powder particles in the range of 2 to 25 μm, preferably of 2 to 15 μm.

It is preferred that the solder has a liquidus temperature in a range of 200 to 250 °C, preferably in a range of 200 to 230 °C.

The term "tin-based solder" means a tin-based soldering alloy comprising tin as the base and one or more other alloying elements. The tin content may be at least 80 wt.-%. Examples of other alloying elements include silver, copper, antimony, bismuth, indium, nickel and cobalt. Lead is an example of a possible but less preferred alloying element.

The solder paste of the invention comprises 40 to 60 wt.-% of a flux. The flux comprised by the solder paste of the invention consists of, in each case based on its total weight:

- i) 50 to 60 wt.-% of at least one optionally modified natural resin;
- ii) 15 to 30 wt.-% of at least one organic solvent;
- iii) 5 to 15 wt.-% of at least one thickener;
- iv) 5 to 10 wt.-% of at least one activator; and
- v) 0 to 10 wt.-% of at least one additive other than constituents i) to iv).

As constituent i), the flux comprises 50 to 60 wt.-%, preferably 50 to 55 wt.-% of at least one optionally modified natural resin. For the person skilled in the art it is not necessary to explain that "modified" stands for a chemical modification. The at least one optionally modified natural resin may be unmodified natural resin or modified natural resin. Modified natural resin means natural resins modified by hydrogenation, dimerization, and/or esterification of their carboxyl groups. In particular, the natural resins are natural resins of the rosin type (colophonium resin type), i.e., unmodified or modified rosins (rosins modified by hydrogenation, dimerization, and/or esterification of their carboxyl groups).

As constituent ii), the flux comprises 15 to 30 wt.-%, preferably 20 to 25 wt.-% of at least one organic solvent. Examples include diols, alcohols, ether alcohols, and ketones that are liquid at 25 °C, in particular trimethylpropanol, 1,2-octanediol, 1,8-octanediol, 2,5-dimethyl-2,5-hexanediol, isobornyl cyclohexanol, glycol ethers, 2-ethyl-1,3-hexanediol, n-decyl alcohol, 2-methyl-2,4-pentanediol, terpineol, and isopropanol, and mixtures thereof. Glycol ethers represent preferred examples. Glycol ethers may be partly or fully etherified; specific examples include mono-, di-, tripropylene glycol methyl ether, mono-, di-, tripropylene glycol n-butyl ether, ethylene glycol dimethyl ether, triethylene glycol methyl ether, diethylene glycol dibutyl ether, tetraethylene glycol dimethyl ether, and diethylene glycol monohexyl ether, and mixtures thereof. It may be preferred that the at least one organic solvent may comprise or consist of one or more glycol ethers.

As constituent iii), the flux comprises 5 to 15 wt.-%, preferably 8 to 12 wt.-% of at least one thickener. Examples include ethyl cellulose, castor oil, hydrogenated castor oil, glycerol tris-12-hydroxystearin, modified glycerol tris-12-hydroxystearin, fatty acid amides, and polyamides. Castor oil and polyamides represent preferred examples. It may be preferred that the at least one thickener comprises or consists of castor oil and/or one or more polyamide thickeners.

As constituent iv), the flux comprises 5 to 10 wt.-% of at least one activator. The function of the at least one activator is to remove eventually present solder powder surface oxide. Examples include carboxylic acids, preferably dicarboxylic acids, for example, oxalic acid, adipic acid, malonic acid, succinic acid, glutaric acid, pimelic acid, suberic acid, azelaic acid, sebacic acid, undecanedioic acid, dodecanedioic acid, and tridecanedioic acid. The carboxylic acids may be combined with at least one amine. Examples of amines include imidazoles, N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane, and 1,10-diaminodecane, bis(2-ethylhexyl)amine, bis(2-methylhexyl)amine, diethylamine, triethylamine, cyclohexylamine, diethanolamine, triethanolamine, hydrogenated tallow alkylamine, hydrogenated (tallow alkyl)dimethylamine, and hydrogenated bis(tallow alkyl)methylamine. Further examples of activators include halogen-containing compounds like aniline hydrochloride, glutamic acid hydrochloride, diethanolamine hydrochloride, diethanolamine hydrobromide, triethanolamine hydrochloride, triethanolamine hydrobromide, and trans-2,3-dibromo-2-butene-1,4-diol.

As constituent v), the flux comprises 0 to 10 wt.-% of at least one additive other than constituents i) to iv). Examples of such additives include surfactants, antioxidants and surface modifiers.

A further subject matter of the present invention is a method for producing the solder paste of the invention.

The method for producing the solder paste of the invention comprises the steps of:

mixing the constituents of the flux, and adding a solder powder as mentioned above.

The addition of the solder powder is preferably carried out in several portions while stirring to a presented mixture of the flux, generally without heating.

The solder paste of the invention can be used for connecting (attaching) electronic components to substrates. When connecting electronic components to substrates, metallic contact pads of the substrate and metallic contact pads of the electronic components are contacted via the solder paste of the invention. Hence, the invention relates also to a method for connecting an electronic component to a substrate comprising the following steps:

a) providing an electronic component having at least one metallic contact pad,
b) providing a substrate having at least one metallic contact pad corresponding to the at least one metallic contact pad of the electronic component (=corresponding to that one single metallic contact pad or those two or more metallic contact pads of the electronic component),
c) providing the at least one metallic contact pad of the electronic component and/or the corresponding at least one metallic contact pad of the substrate with the solder paste of the invention,
d) contacting the at least one metallic contact pad of the electronic component with the corresponding at least one metallic contact pad of the substrate via the solder paste; and
e) heating the solder paste above the liquidus temperature of the solder and subsequently allowing the solder to cool and solidify while forming a solid connection between the electronic component and the substrate.

Steps a) and b) are self-explanatory and require no further explanation for a skilled person. However, to prevent misunderstandings, the person skilled in the art will understand that both, the electronic component as well as the substrate may have one, two or more of said metallic contact pads. The word “corresponding” expresses that the metallic contact pad(s) of the electronic component is/are similar to or even identical to (=correspond to) the metallic contact pad(s) of the substrate in size, shape and arrangement and that both, the metallic contact pad(s) of the electronic component and that or those of the substrate is/are to be connected to each other.

In step c), the at least one metallic contact pad of the electronic component and/or the corresponding at least one metallic contact pad of the substrate are provided with the solder paste of the invention, i.e. the solder paste of the invention can be applied to the at least one metallic contact pad of the electronic component and/or to the corresponding at least one metallic contact pad of the substrate, in particular to the corresponding at least one metallic contact pad of the substrate. The application can be performed by means of conventional methods known to the person skilled in the art, for example, by means of printing, dispensing, jetting or transferring. Printing methods like screen or stencil printing are preferred. It is advantageous, that the solder paste of the invention meets challenges coming with stencil printing with stencils having openings of dimensions down to sub-hundred μm.

The applicant has discovered an unexpected and advantageous feature of the solder paste of the invention; the solder paste of the invention exhibits a so-called self-alignment property, i.e. solder paste of the invention exceeding into the non-metallic surrounding of a metallic contact pad is capable of pulling back between the metallic contact pad(s) of the electronic component and the corresponding metallic contact pad(s) of the substrate when heated in the course of final process step e). In other words, when heated in the course of step e), it can pull back from non-metallic surface portions and gather between the metallic contact pad(s) of the electronic component and the corresponding metallic contact pad(s) of the substrate. Usually, solder paste should be applied onto a metallic contact pad and any solder paste spread to a metallic contact pad’s non-metallic and electrically insulating surrounding is not allowed, since this would mean a high risk for creation of an electrical short-circuit after conclusion of step e); however, said pulling back behavior of the solder paste of the invention allows for some inaccuracy when applying it onto a metallic contact pad. In other words, in step c) the solder paste of the invention allows to be applied onto metallic contact pads exceeding those to some small extent, for example, spreading it, for example, up to 50 μm or, preferably, only up to 25 μm onto a non-metallic surrounding of a metallic contact pad.

Step d) is a so-called picking and placing step. In step d), the at least one metallic contact pad of the electronic component and the corresponding at least one metallic contact pad of the substrate can be contacted to one another via the solder paste of the invention applied in step c). In other words, a sandwich arrangement can be created from the electronic component and the substrate with the solder paste of the invention in between, i.e. between the metallic contact pad(s) of the electronic component and the corresponding metallic contact pad(s) of the substrate.

Step e) is a so-called solder reflow step. In step e), the sandwich arrangement can be soldered by heating the solder paste to above the liquidus temperature of the solder so as to produce a firm connection between the electronic component and the substrate via the solder paste after subsequent cooling and solidification of the solder. The sandwich arrangement or the solder paste is preferably heated to a temperature which is 5 to 60 °C, preferably 10 to 50 °C, above the liquidus temperature of the solder. The skilled person will understand that during step e) the flux is removed, for example, by evaporation and/or decomposition. The skilled person, who has read the description of step c), will also understand, that in the course of being heated up during step e) the solder paste pulls back from non-metallic surface portions and gathers between the metallic contact pad(s) of the electronic component and the corresponding metallic contact pad(s) of the substrate.

The self-alignment performance as well as the solder performance of the solder paste of the invention can be checked by visual inspection of the soldered sandwich arrangement after conclusion of step e). Good self-alignment performance means absence of solder beads (lumps of solder material) on the non-metallic surroundings of metallic contact pads, i.e. no solder beads remaining on the non-metallic surroundings of metallic contact pads. Good solder performance means no occurrence of electrically short-cutting solder bridging between metallic contact pads of the substrate or, respectively, between metallic contact pads of the electronic component. If a visual inspection by the human eye is not directly possible, an X-ray image of the soldered sandwich arrangement can be taken and can be inspected for the absence of said solder beads and the non-occurrence of said solder bridging.

The pulling back behavior or self-alignment property of the solder paste of the invention makes the latter in particular useful in said fine pitch applications or ultrafine-pitch applications. This means, that the solder paste of the invention can be used for connecting electronic components having at least one pair (=a positive and a negative pole) of metallic contact pads to substrates having a corresponding pair or corresponding pairs of metallic contact pads, wherein each metallic contact pad of an individual pair of metallic contact pads is spaced from each other no less than 50 μm and no more than 100 μm; in other words, the metallic contact pads of an individual pair of metallic contact pads have a narrow gap of 50 to 100 μm in between. Here, in the case of a fine pitch application or ultrafine-pitch application, the method for connecting an electronic component to a substrate is a special embodiment of the afore disclosed method comprising the steps a) to e). Here, the invention relates to a method for connecting an electronic component to a substrate comprising the following steps:

a') providing an electronic component having at least one pair of metallic contact pads with a gap of 50 to 100 μm in between, b') providing a substrate having at least one pair of metallic contact pads corresponding to the at least one pair of metallic contact pads of the electronic component (=corresponding to that one single pair or those two or more pairs of metallic contact pads of the electronic component), c') providing the substrate's at least one pair of metallic contact pads as well as the 50 to 100 μm narrow gap in between with the solder paste of the invention, d') contacting the at least one pair of metallic contact pads of the electronic component with the corresponding at least one pair of metallic contact pads of the substrate via the solder paste; and e') heating the solder paste above the liquidus temperature of the solder and subsequently allowing the solder to cool and solidify while forming a solid connection between the electronic component and the substrate.

In step a') an electronic component having at least one pair of metallic contact pads with a narrow gap of 50 to 100 μm in between is provided. As already mentioned, the metallic contact pads of an individual pair of metallic contact pads have a narrow gap of 50 to 100 μm in between. While the metallic contact pads represent electrically conductive metallic surface portions, the narrow gap portion represents an electrically non-conductive (electrically insulating) non-metallic surface portion, i.e. a non-metallic gap. Examples of such type of electronic component include mini-LEDs and micro-LEDs equipped with a pair of metallic contact pads spaced from each other by a narrow gap of 50 to 100 μm. In an expedient embodiment, the metallic contact pads of the electronic component, in particular, the metallic contact pads of a mini-LED or micro-LED may exhibit a surface of tin or of a tin-based alloy, for example, in the form of a tin or tin-based alloy surface plating.

In step b') a substrate having at least one pair of metallic contact pads corresponding to the at least one pair of metallic contact pads of the electronic component provided in step a') is provided. The word "corresponding" expresses that the electronic component's at least one pair of metallic contact pads is similar to or even identical to (=corresponds to) the at least one pair of metallic contact pads of the substrate in size, shape, arrangement and gap width, and that both, the pair(s) of metallic contact pads of the electronic component and the pair(s) of metallic contact pads of the substrate is/are to be connected to each other. To give an example, in case of said mini-LED or micro-LED, the substrate has a pair of metallic contact pads corresponding to those of the mini-LED or micro-LED; in other words, here, the word "corresponding" expresses that the mini-LED's or micro-LED's pair of metallic contact pads is similar to or even identical to (=corresponds to) the pair of metallic contact pads of the substrate in size, shape, arrangement and gap width and that both, the pair of metallic contact pads of the mini-LED or micro-LED and the pair of metallic contact pads of the substrate are to be connected to each other, wherein the connection is to be made so as to match the narrow gaps or, to be more precise, such connection is to be made so as to position said narrow gaps as congruently as possible.

In step c'), the solder paste of the invention is applied, i.e. the substrate's at least one pair of metallic contact pads as well as the 50 to 100 μm narrow gap in between is provided with the solder paste of the invention. The application can be performed by means of conventional methods known to the person skilled in the art, for example, by means of printing, dispensing, jetting or transferring. Printing methods like screen or stencil printing are preferred. However, nota bene, due to the tiny structures prevailing in fine pitch or ultra-fine pitch applications the application tool (dispenser, printing screen, printing stencil or the like) does not allow for absolutely precisely applying solder paste only onto the at least one pair of metallic contact pads of the substrate without some spreading onto said non-metallic gap-forming area in between. However, here in the embodiment of fine pitch application or ultrafine-pitch application, the application of the solder paste of the invention onto that narrow non-metallic surface portion is not only deliberately accepted or tolerated; rather, it is expressly allowed instead. Hence, in this step c'), the solder paste of the invention is applied onto the substrate's at least one pair of metallic contact pads as well as the 50 to 100 μm narrow gap in between; i.e. it is applied to the substrate's contact pads' metallic surface portions as well as the entire gap-forming 50 to 100 μm narrow non-metallic surface portion in between, i.e. no portion of that gap-forming 50 to 100 μm narrow non-metallic surface portion is left uncovered, instead, it is filled with the solder paste.

It is remarkably advantageous that the solder paste of the invention exhibits said self-alignment property. When heated in the course of step e'), the solder paste of the invention in the non-metallic gap area pulls back and gathers between the at least one pair's metallic contact pads of the electronic component and the corresponding at least one pair's metallic contact pads of the substrate.

Step d') is a so-called picking and placing step in the course of which the at least one pair of metallic contact pads of the electronic component and the corresponding at least one pair of metallic contact pads of the substrate can be contacted to one another via the solder paste of the invention. In other words, a sandwich arrangement can be created from the electronic component and the substrate with the solder paste of the invention in between, i.e. between the metallic contact pads of the at least one pair of metallic contact pads of the electronic component and the metallic contact pads of the corresponding at least one pair of metallic contact pads of the substrate.

Step e') is a so-called solder reflow step. In step e'), the sandwich arrangement can be soldered by heating the solder paste of the invention to above the liquidus temperature of the solder so as to produce a firm connection between the electronic component and the substrate via the solder paste after subsequent cooling and solidification of the solder. The sandwich arrangement or the solder paste is preferably heated to a temperature which is 5 to 60 °C, preferably 10 to 50 °C, above the liquidus temperature of the solder. In the course of said heating the solder paste of the invention experiences the aforementioned advantageous pull back process. As a result, the non-metallic gap is cleared and the solder of the solder paste finds itself only between the metallic contact pads of the at least one pair of metallic contact pads of the substrate and the metallic contact pads of the corresponding at least one pair of metallic contact pads of the electronic component. The skilled person will understand that during step e') the flux is removed, for example, by evaporation and/or decomposition. The skilled person, who has read the description of step c'), will also understand, that in the course of being heated up during step e') the solder paste pulls back from non-metallic surface portions (including the non-metallic surface portion of the gap) and gathers between the metallic contact pads of the at least one pair of metallic contact pads of the substrate and the metallic contact pads of the corresponding at least one pair of metallic contact pads of the electronic component.

The pulling back behavior or self-alignment performance as well as the solder performance of the solder paste of the invention can be checked by taking an X-ray image of the soldered sandwich arrangement after conclusion of step e'). The X-ray image can then be visually inspected. Good self-alignment performance means absence of solder beads on the non-metallic surroundings of metallic contact pads or in the gap area, i.e. no solder beads remaining there. Good solder performance means no occurrence of electrically short-cutting solder bridging between metallic contact pads of the substrate or, respectively, between metallic contact pads of the electronic component.

Working Example

A flux was formed by melting 52 pbw (parts by weight) of a hydrogenated rosin (hydrogenated colophonium resin) having an acid value of 240 mg KOH/g at 170 °C, followed by addition of 25 pbw of ethylene glycol dimethyl ether, 8 pbw of a polyamide thickener, 4 pbw of succinic acid, 3 pbw of N,N,N',N'-tetramethylethylenediamine, 6 pbw of surfactant and 2 pbw of antioxidant at 140 °C.

A solder paste was formed by mixing 50 pbw of the so prepared flux with 50 pbw of solder powder (SnAgCu alloy composed of 96.5 wt.-% Sn, 3.0 wt.-% Ag and 0.5 wt.-% Cu, type 6 powder according to IPC-TM-650 2.2.14.2).

The so prepared solder paste was stencil printed on a glass-reinforced epoxy laminate FR4 PCB substrate exhibiting pairs of rectangular copper contact pads of dimensions 55 μm by 80 μm. The copper contact pads had an ENIG (Electroless Nickel Immersion Gold) surface finish. The copper contact pads of each pair of copper contact pads were spaced from one another by a 50 μm narrow gap. Openings in the stencil were rectangular in shape of dimensions 70 μm by 130 μm. The solder paste was applied over the substrate's copper contact pads, as well as the 50 μm narrow gap of the non-metallic surface portion in between the copper contact pads. After the solder paste stencil printing step, a mini-LED die of dimensions 100 μm by 150 μm was placed on top of each pair of rectangular-patterned solder paste. Each mini-LED die backside consisted of two tin alloy-plated contact pads, wherein each contact pad was 30 μm by 50 μm; between the two contact pads there was a narrow gap of 50 μm. Placing of the LED die was performed such that the narrow 50 μm gap between the LED die's tin alloy-plated contact pads was exactly overlapping with the narrow 50 μm gap between the substrate's copper contact pads and filled with the solder paste which had been applied by stencil printing.

The so prepared sandwich arrangement consisting of the mini-LED die and the FR4 PCB substrate with the solder paste in between was soldered by heating in a reflow oven with a peak temperature of 250 °C in a nitrogen atmosphere. After the solder paste had melted, the sandwich arrangement was removed and cooled.

After the sandwich arrangement had cooled down, an assessment of the self-alignment performance of the solder paste was made. To this end, an X-ray image of the soldered sandwich arrangement was taken from above with a Nordson X-ray (Model: Q5) machine, and it was visually inspected for any solder beads remaining on the non-metallic gap between the copper contact pads of the FR4 PCB substrate. No solder beads were detected, which means that the solder paste exhibited a very good self-alignment performance.

The solder performance was also evaluated by visually inspecting the same X-ray image, whether a solder bridging had occurred between the two tin alloy-plated contact pads of the LED die. This was not the case, which means that no undesired electrical short-cutting of the LED die's contact pads had occurred.

The invention claimed is:

1. A solder paste consisting of 40 to 60 wt.-% of a solder powder with an absolute particle size of the powder particles in the range of 2 to 25 μm, and 40 to 60 wt.-% of a flux, wherein the flux consists of:

i) 50 to 60 wt.-% of at least one optionally modified natural resin;

ii) 15 to 30 wt.-% of at least one organic solvent;

iii) 5 to 15 wt.-% of at least one thickener;

iv) 5 to 10 wt.-% of at least one activator; and v) 0 to 10 wt.-% of at least one additive other than constituents i) to iv).

2. The solder paste of claim 1, wherein the solder has a liquidus temperature in a range of 200 to 250 °C.

3. The solder paste of claim 1, wherein the at least one thickener comprises castor oil or one or more polyamide thickeners.

4. The solder paste of claim 1, wherein the at least one thickener comprises castor oil and one or more polyamide thickeners.

5. The solder paste of claim 1, wherein the absolute particle size of the powder particles is in the range of 2 to 15 µm.

6. The solder paste of claim 1, wherein the flux consists of:

i) 50 to 55 wt.-% of the at least one optionally modified natural resin;

ii) 20 to 25 wt.-% of the at least one organic solvent;

iii) 8 to 12 wt.-% of the at least one thickener;

iv) 5 to 10 wt.-% of the at least one activator; and v) 0 to 10 wt.-% of the at least one additive other than constituents i) to iv).

7. The solder paste of claim 1, wherein the at least one activator comprises a carboxylic acid selected from the group consisting of oxalic acid, adipic acid, malonic acid, succinic acid, glutaric acid, pimelic acid, suberic acid, azelaic acid, sebacic acid, undecanedioic acid, dodecanedioic acid, tridecanedioic acid, and glutamic acid hydrochloride.

8. The solder paste of claim 1, wherein the at least one activator comprises:

a carboxylic acid selected from the group consisting of oxalic acid, adipic acid, malonic acid, succinic acid, glutaric acid, pimelic acid, suberic acid, azelaic acid, sebacic acid, undecanedioic acid, dodecanedioic acid, tridecanedioic acid, and glutamic acid hydrochloride, and an amine selected, from the group consisting of imidazoles, N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane, and 1,10-diaminodecane, bis(2-ethylhexyl)amine, bis(2-methylhexyl)amine, diethylamine, triethylamine, cyclohexylamine, diethanolamine, triethanolamine, hydrogenated tallow alkylamines, hydrogenated (tallow alkyl)dimethylamines, hydrogenated bis(tallow alkyl)methylamines, aniline hydrochloride, diethanolamine hydrochloride, diethanolamine hydrobromide, triethanolamine hydrochloride, and triethanolamine hydrobromide.

9. The solder paste of claim 1, wherein the at least one thickener is selected from the group consisting of ethyl cellulose, castor oil, hydrogenated castor oil, glycerol tris-12-hydroxystearin, modified glycerol tris-12-hydroxystearin, fatty acid amides, and polyamides.

10. The solder paste of claim 1, wherein the at least one organic solvent comprises an alcohol selected from the group consisting of trimethylpropanol, 1,2-octanediol, 1,8-octanediol, 2,5-dimethyl-2,5-hexanediol, isobornyl cyclohexanol, 2-ethyl-1,3-hexanediol, n-decyl alcohol, 2-methyl-2,4-pentanediol, terpineol, and isopropanol, and any mixture thereof.

11. The solder paste of claim 1, wherein the solder powder is a tin-based solder powder.

12. The solder paste of claim 11, wherein the tin-based solder powder comprises at least 80 wt % of tin.

13. The solder paste of claim 1, wherein the at least one organic solvent comprises of one or more glycol ethers.

14. The solder paste of claim 13, wherein the one or more glycol ethers are selected from the group consisting of monopropylene glycol methyl ether, dipropylene glycol methyl ether, tripropylene glycol methyl ether, monopropylene glycol n-butyl ether, dipropylene glycol n-butyl ether, tripropylene glycol n-butyl ether, ethylene glycol dimethyl ether, triethylene glycol methyl ether, diethylene glycol dibutyl ether, tetraethylene glycol dimethyl ether, diethylene glycol monohexyl ether, and any mixture thereof.

15. A method for connecting an electronic component to a substrate, the method comprising the steps of:

a) providing an electronic component having at least one metallic contact pad;

b) providing a substrate having at least one metallic contact pad corresponding to the at least one metallic contact pad of the electronic component;

c) providing the at least one metallic contact pad of the electronic component and/or the corresponding at least one metallic contact pad of the substrate with the solder paste of claim 1;

d) contacting the at least one metallic contact pad of the electronic component with the corresponding at least one metallic contact pad of the substrate via the solder paste; and, e) heating the solder paste above the liquidus temperature of the solder and subsequently allowing the solder to cool and solidify while forming a solid connection between the electronic component and the substrate.

16. The method of claim 15, wherein in step c) the solder paste is applied onto the at least one metallic contact pad exceeding it to a small extent by spreading it up to 50 µm onto its non-metallic surrounding.

17. A method for connecting an electronic component to a substrate, the method comprising the steps of:

a') providing an electronic component having at least one pair of metallic contact pads with a gap of 50 to 100 µm in between;

b') providing a substrate having at least one pair of metallic contact pads corresponding to the at least one pair of metallic contact pads of the electronic component;

c') providing the substrate's at least one pair of metallic contact pads as well as the 50 to 100 µm narrow gap in between with the solder paste of claim 1;

d') contacting the at least one pair of metallic contact pads of the electronic component with the corresponding at least one pair of metallic contact pads of the substrate via the solder paste; and, e') heating the solder paste above the liquidus temperature of the solder and subsequently allowing the solder to cool and solidify while forming a solid connection between the electronic component and the substrate.

18. The method of claim 17, wherein the electronic component is a mini-or micro-LED equipped with a pair of metallic contact pads spaced from each other by a narrow gap of 50 to 100 µm.

* * * * *